United States Patent
Larmande et al.

(10) Patent No.: US 6,666,437 B2
(45) Date of Patent: Dec. 23, 2003

(54) HYDRAULIC ANTI-VIBRATION SLEEVE

(75) Inventors: Franck Larmande, Grand Rapids, MI (US); Michel Champrenault, Kentwood, MI (US)

(73) Assignee: Paulstra CRC, Grand Rapids, MI (US)

( * ) Notice: Subject to any disclaimer, the term of this patent is extended or adjusted under 35 U.S.C. 154(b) by 0 days.

(21) Appl. No.: 10/105,555

(22) Filed: Mar. 25, 2002

(65) Prior Publication Data

US 2003/0178754 A1 Sep. 25, 2003

(51) Int. Cl.[7] ................................................. F16F 7/00
(52) U.S. Cl. ................................................. 267/141.2
(58) Field of Search .......................... 267/141.2, 294, 267/293, 292, 141.1, 141, 140.12, 140.11, 140.3, 140.4

(56) References Cited

U.S. PATENT DOCUMENTS

| | | | | |
|---|---|---|---|---|
| 4,702,346 A | * | 10/1987 | Uno et al. | 181/207 |
| 4,848,756 A | | 7/1989 | Funahashi et al. | |
| 4,936,557 A | * | 6/1990 | Schwerdt | 267/141.2 |
| 5,040,774 A | * | 8/1991 | Veverka et al. | 267/140.12 |
| 5,123,634 A | * | 6/1992 | Schwerdt | 267/140.12 |
| 5,185,916 A | | 2/1993 | Maeno et al. | |
| 5,188,346 A | * | 2/1993 | Hamada et al. | 267/140.12 |
| 5,190,269 A | * | 3/1993 | Ikeda et al. | 267/140.12 |
| 5,397,112 A | | 3/1995 | Roth et al. | |
| 5,413,319 A | * | 5/1995 | Hein et al. | 267/140.12 |
| 5,492,310 A | | 2/1996 | Bungart et al. | |
| 5,702,094 A | * | 12/1997 | McLelland et al. | 267/140.12 |
| 5,895,031 A | * | 4/1999 | Meyer et al. | 267/140.12 |
| 5,954,317 A | | 9/1999 | Meyer et al. | |
| 6,364,298 B1 | * | 4/2002 | Vossel et al. | 267/293 |
| 6,513,801 B1 | * | 2/2003 | McCarthy | 267/293 |

FOREIGN PATENT DOCUMENTS

| | | |
|---|---|---|
| DE | 41 24 705 | 2/1992 |
| EP | 0 656 487 | 3/1997 |
| JP | 05065933 | 3/1993 |

OTHER PUBLICATIONS

International Search Report; EP 03 29 0678 dated Jun. 24, 2003.

* cited by examiner

Primary Examiner—Jack Lavinder
Assistant Examiner—Benjamin A Pezzlo
(74) Attorney, Agent, or Firm—Marshall, Gerstein & Borun LLP

(57) ABSTRACT

An anti-vibration sleeve comprising inner and outer strength members, an elastomer body connecting the strength members together and forming two hydraulic chambers, and a C-shaped intermediate member which is snap-fitted around the elastomer body and clamped between the elastomer body and the outer strength member, the intermediate member forming a throttled passage which connects the two hydraulic chambers together.

13 Claims, 3 Drawing Sheets

HYDRAULIC ANTI-VIBRATION SLEEVE

FIELD OF THE INVENTION

The present invention relates to hydraulic anti-vibration sleeves, used in particular in automobiles.

More particularly, the invention relates to a hydraulic anti-vibration sleeve comprising:

a rigid inner strength member extending parallel to a central axis, a tubular, rigid outer strength member surrounding the inner strength member and the central axis, an elastomer body connecting the inner and outer strength members together and forming at least two hydraulic chambers communicating with one another via a throttled passage, said hydraulic chambers and said throttled passage being filled with a liquid, and an intermediate member which is fitted around the elastomer body and clamped between the elastomer body and the outer strength member, the throttled passage being at least partially bounded by the intermediate member, and said intermediate member extending in a circumferential direction around the central axis between the two hydraulic chambers.

BACKGROUND OF THE INVENTION

Document EP-B-0 656 487 discloses a hydraulic anti-vibration sleeve of this type, in which the intermediate member forms a belt which completely surrounds the elastomer body and which is made out of two rigid parts. When assembling the intermediate member to the elastomer body, the two portions forming the elastomer body must be snap-fitted together around the elastomer body.

Although this prior anti-vibration sleeve gave perfect satisfaction in use, this assembling process proved cumbersome and sometimes difficult to carry out, since the two portions of the intermediate member had to be snap-fitted together while being clamped around the elastomer body.

An object of the present invention is to remedy this drawback.

OBJECTS AND SUMMARY OF THE INVENTION

To this end, according to the invention, said intermediate member is a C-shaped, unitary, resilient member and is snap-fitted around the elastomer body, said intermediate member extending in a circumferential direction around the central axis on an angle of at least 200°, said intermediate member thus being sufficiently elastically clamped around the elastomer member so that said intermediate member be securely fixed on said elastomer member before the outer strength member is fitted on said elastomer body.

Thanks to these dispositions, the assembling process of the intermediate member to the elastomer body is very simple to carry out, since it does not imply assembling together several pieces around the elastomer body.

Further, the present invention also renders the global assembling process of the sleeve more reliable, since the intermediate member is held by itself around the elastomer body, so that there is virtually no risk that said intermediate member be disassembled from the elastomer body between the step of snap-fitting said intermediate member around the elastomer body and the step of tight fitting the outer strength member around the elastomer body.

In advantageous embodiments, one may further use one and/or other of the following arrangements:

the intermediate member is made of plastic material;

the elastomer body includes first and second arms which separate the two hydraulic chambers, the intermediate member including:

a connecting portion which is clamped between the first axial arm and the outer strength member, and two end portions which are linked together by said connecting portion and which extend respectively in the two hydraulic chambers;

at least one of the end portions of the intermediate member includes an abutment portion which protrudes radially inwardly in one of the hydraulic chambers and which is adapted to cooperate with the elastomer body for limiting relative radial movements of the inner and outer strength members;

the elastomer body is over-molded on a rigid armature which includes two annular bushings interconnected by at least an axial strut extending in the first axial arm of the elastomer body, said connecting portion of the intermediate member being radially clamped between said axial strut and the outer strength member;

each of said end portions of the intermediate member is radially clamped between the two bushings of the rigid armature and the outer strength member;

each of said two end portions of the intermediate member extend up to a free end which is close to the second axial arm of the elastomer body;

the connecting portion of the intermediate member is tightly fitted in a groove formed in the first axial arm of the elastomer body;

said end portions are larger than the connecting portion parallel to the central axis and said throttled passage forms sinuosities at least in one of said end portions;

the intermediate member is made out of a single piece and includes an arcuate groove which is open toward the outer strength member, said intermediate member being in tight contact with the outer strength member so that said groove and said outer strength member entirely bound the throttled passage;

the intermediate member includes a tube which entirely bounds the throttled passage;

the elastomer body includes first and second arms which separate the two hydraulic chambers, said tube being clamped between the first axial arm of the elastomer body and the outer strength member, and wherein the intermediate member further includes two end portions which are linked together by said tube and which extend respectively in the two hydraulic chambers;

said end portions of the intermediate member are over-molded on said tube;

said intermediate member extends in a circumferential direction around the central axis on an angle of at most 340°.

BRIEF DESCRIPTION OF THE DRAWINGS

Other features and advantages of the invention will appear from the following description of three of its embodiments, given by way of non-limitative examples, with reference to the accompanying drawings.

In the drawings.

MORE DETAILED DESCRIPTION

Figure 1:
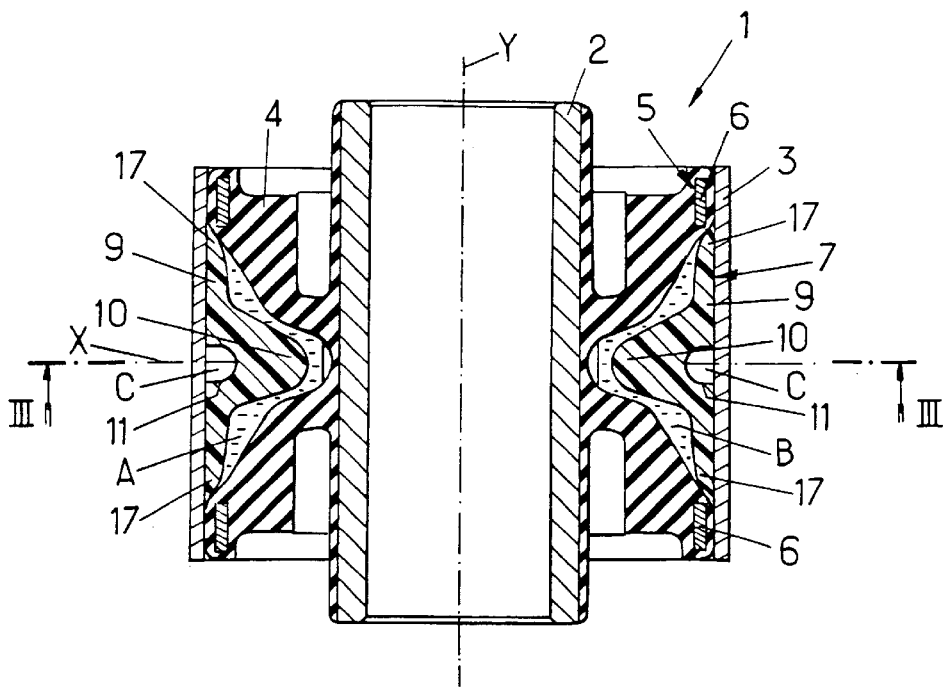
FIG. 1 shows an axial section view of an anti-vibration sleeve according to a first embodiment of the invention.

In the various figures, the same reference numerals designate identical or similar elements.

FIG. 1 shows a hydraulic anti-vibration sleeve 1 which is adapted to link together two rigid elements for anti-vibration purposes. The two rigid elements to be inked together through the anti-vibration sleeve 1 may be, for instance, an axle system of a vehicle and a vehicle body or frame.

As can be seen on FIG. 1, the anti-vibration sleeve 1 according to the invention includes:

- a rigid inner strength member 2 which extends parallel to a central axis Y and which may be constituted for instance by a metal tube adapted to be fixed to one of the rigid elements to be connected together,
- a tubular rigid strength member 3 which surrounds the inner strength member 2 and the central axis Y, said outer strength member 3 being constituted for instance by a metal sleeve adapted to be fixed to the other of the rigid elements to be connected together,
- an elastomer body 5 connecting together the inner and outer strength members 2,3 and at least two hydraulic chambers A, B which communicate with one an other via a throttled passage C, being filed with the liquid, the elastomer body 4 being for instance over-molded on and bonded to the inner strength member 2 and said elastomer body 4 being further over-molded on a rigid metal armature 5 which includes two bushings 6 around which the outer strength member 3 is tightly fitted,
- and an intermediate member 7 which is fitted around the elastomer body 4 and clamped between said elastomer body and the outer strength member 3.

Figure 2:
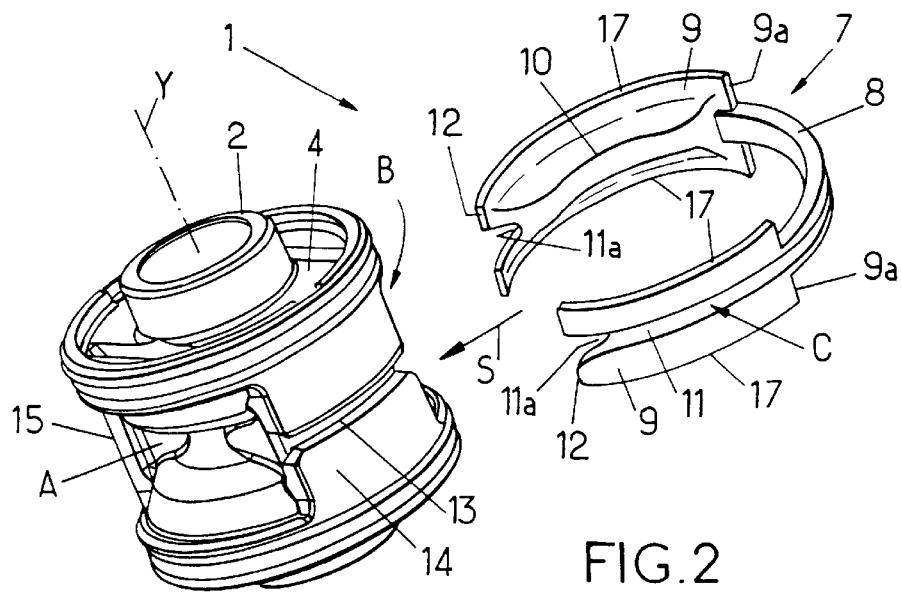
FIG. 2 is a perspective view showing the intermediate member being snap-fitted on the elastomer body of the sleeve of FIG. 1.

As can be seen on FIG. 2, the intermediate member 7 is a C-shaped, unitary, resilient member and extends in a circumferential direction, around a central axis Y, on an angle which is more than 180° and which may advantageously be comprised between 200° and 340°.

Said intermediate member may be for instance molded out of plastic material (for instance polyamide or polyurethane) as a single piece, and may advantageously include:

- a connecting portion 8 of relatively small dimension in the direction of axis Y,
- and two end portions 9 which are connected together by the connecting portion 8 and which are of larger dimension in the direction of axis Y.

Preferably, at least one of the end portions 9, and advantageously both end portions 9, include an abutment portion 10 which protrudes radially inwardly.

Further, the intermediate member includes a circumferential groove 11 which is open radially outwardly and which may for instance extend on the complete length of the intermediate member, between two open ends 11a at the free ends 12 of the C-shaped intermediate member.

As shown on FIG. 2, when assembling the intermediate member 7 on the elastomer body, said intermediate member is simply snap-fitted on the elastomer body 4, substantially in the direction of the arrow S, so that the connecting portion 8 of intermediate member 7 is fitted in a radial groove 13 in a first axial arm 14 of the elastomer body. Said first axial arm 14 is aligned with a second axial arm 15 of the elastomer body in a radial direction Z. These arms 14, 15 separate the two hydraulic chambers A, B from one another and are in tight contact with the outer strength member 3.

The intermediate member is sufficiently elastically clamped around the elastomer member so that said intermediate member be securely fixed on said elastomer member before the outer strength member is fitted on said elastomer body. For instance, the clamping force exerted by the intermediate member on opposite sides of the elastomer body may be comprised between 1 and 30 kg.

Figure 3:
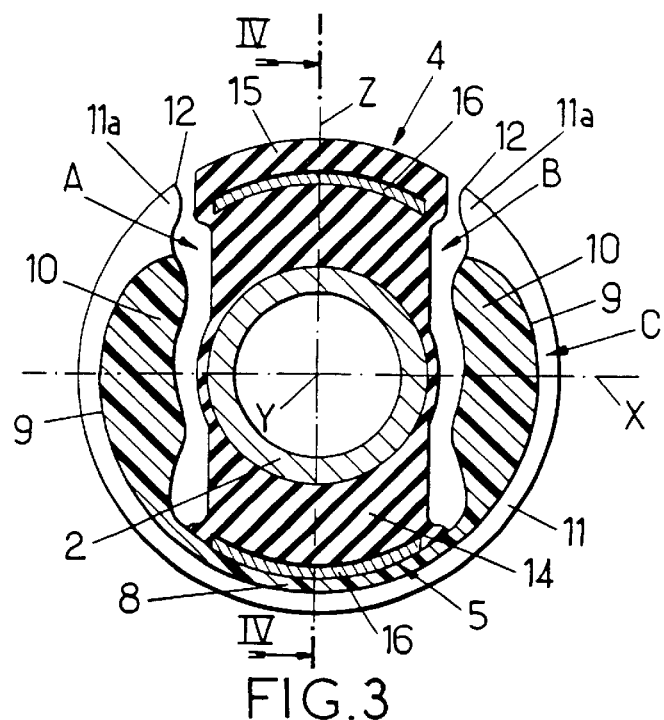
FIG. 3 is a section view of the sleeve of FIG. 1 without its outer strength member, the section being taken along line III—III of FIG. 1.

After the intermediate member 7 has been snap-fitted on the elastomer body 4, as shown in FIGS. 1 and 3, the end portions 9 of the intermediate member respectively extend in the hydraulic chambers A, B, and the two abutment portions 10 of said intermediate member extend inwardly in said hydraulic chambers and are adapted to cooperate with the elastomer body on both sides of the inner strength member 2 for limiting relative radial movements of the inner and outer strength members in the direction of an axis X which is perpendicular to axes Y and Z.

It should be noted that the end portions 9 of the intermediate member could be deprived of abutment portions 10. In such a case, the elastomer body could possibly include abutment portions on one side or both sides of the inner strength member 2 in the direction of axis X.

Besides, as can be seen on FIG. 3, when the intermediate member 7 is assembled on the elastomer body 4, the free ends 12 of said intermediate member are preferably positioned on both sides of the radial arm 15 of the elastomer body, close to said radial arm, and the open ends 11a of the groove 11, which are in the form of V-shaped notches, open circumferentially and radially in the hydraulic chambers A, B in the vicinity of said axial arm 15.

Further, as can be seen on FIG. 1, once the outer strength member has been tightly fitted around the elastomer body 4 and the intermediate member 7, the throttled passage C is entirely bounded by said groove 11 and said outer strength member 3, so that said throttled passage C only communicates with the hydraulic chambers A, B through the open ends 11a of the groove 11.

In this position, the intermediate member is clamped between the elastomer body 4 and the outer strength member 3, so that said intermediate member cannot be displaced in use, relative to the elastomer body 4 and the outer strength member 3.

Advantageously, in order to reinforce the immobilization of intermediate member 7, the upper and lower rims 17 of the end portions 9 are clamped between the bushings 6 of the rigid armature 5 and the outer strength member 3.

This immobilization is further reinforced by the fact that the end edges 9a of the end portions 9 of the intermediate member 7 are in abutment on both sides of the first radial arm 14 of the elastomer body (FIG. 2).

Figure 4:
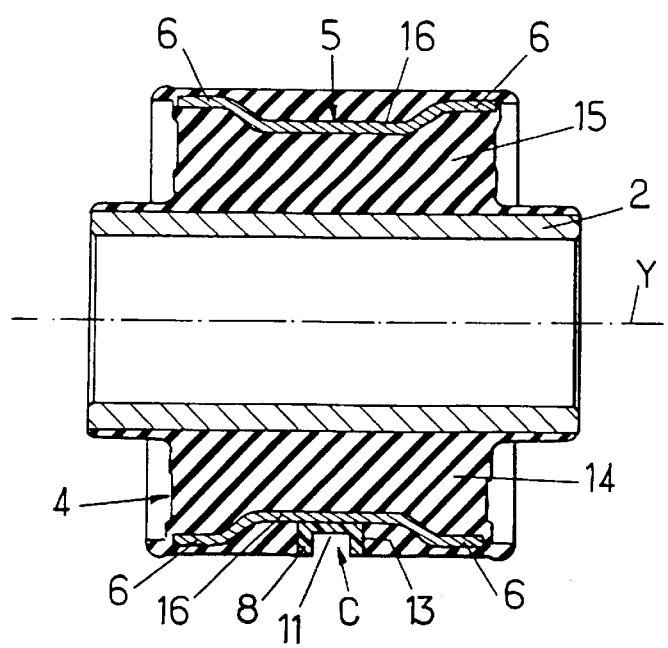
FIG. 4 is a section view of the sleeve of FIG. 1 without its outer strength member, the section being taken along line IV—IV of FIG. 3.

Further as can be seen on FIGS. 3 and 4, the metal armature 5 also includes two axial struts 16 which connect together to two bushings 6 and which are over-molded respectively by the two radial arms 14, 15. Preferably, the connecting portion 8 of the intermediate member is clamped between the outer strength member 3 and the axial strut 16 which is over-molded by the first radial arm 14 of the elastomer body.

The operation of the antivibration sleeve which has been described here-before is well-known in the art, and will not be described here in details.

Figure 5:
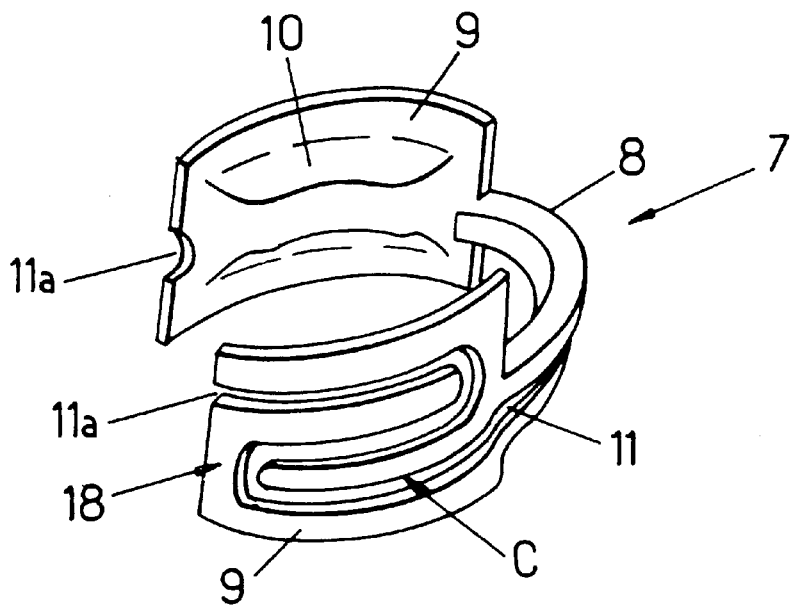
FIG. 5 is a perspective view of the intermediate member of the anti-vibration sleeve, in a second embodiment of the invention.
Figure 6:
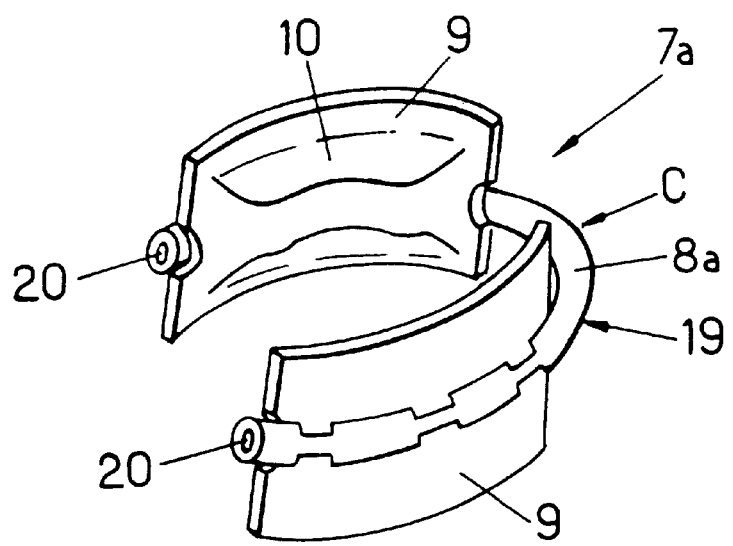
FIG. 6 is a perspective view of the intermediate member of the anti-vibration sleeve, in a third embodiment of the invention.

As can be seen on FIG. 5, the second embodiment of the invention is identical to the first embodiment, except for the intermediate member 7, in which the groove 11 which partially bounds the throttled passage C, forms sinuosities 18 in one or in both of the end portions 9 of said intermediate member 7.

These sinuosities 18 enable to obtain a longer throttled passage C, thus enabling to adjust the resonance frequency of the throttled passage C at a desired value when conceiving the antivibration sleeve.

The third embodiment of the invention is also identical to the first embodiment except for the intermediate member 7a, which includes a tube 19 made out of a resilient plastic material for instance and which entirely bounds the throttled passage C. The tube 19 forms by itself the connection portion 8a of the intermediate member, which is fitted in groove 13 of the elastomer body, and the plastic end portions 9 which were previously disclosed are over-molded on the tube 19.

The two free ends of the tube, which may be for instance level with the free ends 12 of the end portions 9, form the open ends 20 of the throttled passage C.

We claim:

1. A hydraulic anti-vibration sleeve comprising:
    a rigid inner strength member extending parallel to a central axis,
    a tubular, rigid outer strength member surrounding the inner strength member and the central axis,
    an elastomer body connecting the inner and outer strength members together and forming at least two hydraulic chambers communicating with one another via a throttled passage, said hydraulic chambers and said throttled passage being filled with a liquid, the elastomer body including first and second arms which separate the two hydraulic chambers, the elastomer body being over-molded on a rigid armature which includes two annular bushings interconnected by at least an axial strut extending in the first axial arm of the elastomer body, and
    an intermediate member which is fitted around the elastomer body and clamped between the elastomer body and the outer strength member, the throttled passage being at least partially bounded by the intermediate member, and said intermediate member extending in a circumferential direction around the central axis between the two hydraulic chambers, the intermediate member including a connecting portion which is clamped between the first axial arm and the outer strength member, and two end portions which are linked together by said connecting portion and which extend respectively in the two hydraulic chambers, said connecting portion of the intermediate member being radially clamped between said axial strut and the outer strength member, wherein said intermediate member is a C-shaped, unitary, resilient member and is snap-fitted around the elastomer body.

2. An anti-vibration sleeve according to claim 1, wherein the intermediate member is made of plastic material.

3. An anti-vibration sleeve according to claim 1, wherein at least one of the end portions of the intermediate member includes an abutment portion which protrudes radially inwardly in one of the hydraulic chambers and which is adapted to cooperate with the elastomer body for limiting relative radial movements of the inner and outer strength members.

4. An anti-vibration sleeve according to claim 1, wherein each of said end portions of the intermediate member is radially clamped between the two bushings of the rigid armature and the outer strength member.

5. An anti-vibration sleeve according to claim 1, wherein each of said two end portions of the intermediate member extend up to a free end which is close to the second axial arm of the elastomer body.

6. An anti-vibration sleeve according to claim 1, wherein the connecting portion of the intermediate member is tightly fitted in a groove formed in the first axial arm of the elastomer body.

7. A hydraulic anti-vibration sleeve comprising:
    a rigid inner strength member extending parallel to a central axis,
    a tubular rigid outer strength member surrounding the inner strength member and the central axis,
    an elastomer body connecting the inner and outer strength members together and forming at least two hydraulic chambers communicating with one another via a throttle passage, said hydraulic chambers and said throttled passage being filled with liquid,
    an intermediate member which is fitted around the elastomer body and clamped between the elastomer body and the outer strength member, the throttle passage being at least partially bonded by the intermediate member, and said intermediate member extending in each circumferential direction around the central axis between the two hydraulic chambers, wherein said intermediate member is a C-shaped, unitary, resilient member and is snap fitted around the elastomer body,
    wherein the elastomer body includes first and second arms which separate the two hydraulic chambers, the intermediate member including a connecting portion which is clamped between the first axial arm and the outer strength member, and two end portions which are linked together by said connecting portion and which extend respectively in the two hydraulic chambers,
    wherein said end portions are larger than the connecting portion parallel to the central axis and said throttled passage forms sinuosities including at least one meander at least in one of said end portions.

8. An anti-vibration sleeve according to claim 1, wherein the intermediate member is made out of a single piece and includes an arcuate groove which is open toward the outer strength member, said intermediate member being in tight contact with the outer strength member so that said groove and said outer strength member entirely bound the throttled passage.

9. A hydraulic anti-vibration sleeve comprising:
    a rigid inner strength member extending parallel to a central axis,
    a tubular, rigid outer strength member surrounding the inner strength member and the central axis,
    an elastomer body connecting the inner and outer strength members together forming at least two hydraulic chambers communicating with one another via throttled passage, said hydraulic chambers and said throttled passage being filled with liquid,
    and an intermediate member which is fitted around the elastomer body and clamped between the elastomer body and the outer strength member, the throttled passage being at least partially bonded by the intermediate member, and said intermediate member extending in a circumferential direction around the central axis between the two hydraulic chambers, wherein said intermediate members are a C-shaped, unitary, resilient member and is snap fitted around the elastomer body, wherein the intermediate member includes a tube which entirely bounds the throttled passage.

10. An anti-vibration sleeve according to claim 9, wherein the elastomer body includes first and second arms which separate the two hydraulic chambers, said tube being clamped between the first axial arm of the elastomer body and the outer strength member, and wherein the intermediate member further includes two end portions which are linked together by said tube and which extend respectively in the two hydraulic chambers.

11. An anti-vibration sleeve according to claim 10, wherein said end portions of the intermediate member are over-molded on said tube.

12. An anti-vibration sleeve according to claim 1, wherein said intermediate member extends in a circumferential direction around the central axis on an angle of at most 340°.

13. An anti-vibration sleeve according to claim 1, wherein said intermediate member extends in a circumferential direction around the central axis on an angle of at least 200°, said intermediate member thus being sufficiently, elastically clamped around the elastomer member so that said intermediate member is securely fixed on said elastomer member before the outer strength member is fitted on said elastomer body.

* * * * *

UNITED STATES PATENT AND TRADEMARK OFFICE
CERTIFICATE OF CORRECTION

PATENT NO. : 6,666,437 B2
DATED : December 23, 2003
INVENTOR(S) : Franck Larmande et al.

It is certified that error appears in the above-identified patent and that said Letters Patent is hereby corrected as shown below:

<u>Title page,</u>
Item [75], Inventors, please delete "Kentwood, MI (US)" and insert -- Grand Rapids, MI (US) --.

Signed and Sealed this

Twenty-seventh Day of April, 2004

JON W. DUDAS
*Acting Director of the United States Patent and Trademark Office*